(12) United States Patent  (10) Patent No.: US 7,470,198 B2
Cermak  (45) Date of Patent: Dec. 30, 2008

(54) CONNECTING ASSEMBLY BETWEEN A SHAFT JOURNAL AND A UNIVERSAL JOINT

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 233 days.

(21) Appl. No.: 11/066,093

(22) Filed: Feb. 25, 2005

(65) Prior Publication Data

US 2005/0192106 A1  Sep. 1, 2005

(30) Foreign Application Priority Data

Feb. 27, 2004  (DE) .................. 10 2004 009 477

(51) Int. Cl.
 *F16D 1/072* (2006.01)
(52) U.S. Cl. .................. 464/173; 464/182; 464/906
(58) Field of Classification Search .................. 464/15, 464/111, 144–146, 173, 175, 178, 905, 906, 464/182; 403/1, 397
See application file for complete search history.

(56) References Cited

U.S. PATENT DOCUMENTS 3,782,840 A  1/1974  Brishka
3,798,927 A *  3/1974  Girguis ................. 464/146
3,858,412 A *  1/1975  Fisher et al. ............ 464/146
4,756,640 A  7/1988  Gehrke
4,946,303 A *  8/1990  Sawicki ................. 464/175 X
5,522,771 A *  6/1996  Poulin .................. 464/111
5,674,024 A * 10/1997  Daumal Castellon ... 464/182 X
6,264,568 B1 *  7/2001  Frazer et al. ............ 464/173
6,315,671 B1  11/2001  Bilz
6,517,278 B2 *  2/2003  Moulinet ............... 464/182 X

FOREIGN PATENT DOCUMENTS

| DE | 36 42 438 C2 | 6/1987 |
| DE | 102 15 657 A1 | 10/2003 |
| DE | 103 44 703 A1 | 4/2005 |
| EP | 1 519 063 A2 | 3/2005 |

* cited by examiner

*Primary Examiner*—Greg Binda
(74) *Attorney, Agent, or Firm*—Rader, Fishman & Grauer, PLLC (57) ABSTRACT

A connecting assembly between a shaft journal (11) which is supported, and a universal joint (12) whose inner joint part (24) is engaged by the shaft journal (11) in a rotationally fast way, wherein there is provided an axially effective engaging connection between a securing sleeve (41) axially firmly connected to the inner joint part (24) and an annular groove (39) on the shaft journal (11).

15 Claims, 10 Drawing Sheets

CONNECTING ASSEMBLY BETWEEN A SHAFT JOURNAL AND A UNIVERSAL JOINT

TECHNICAL FIELD

The invention relates to a connecting assembly between a shaft journal, which is supported, and a universal joint whose inner joint part is engaged by the shaft journal in a rotationally fast way. The shaft journal and universal joint can be in the propeller shaft of a motor vehicle drive. The shaft journal can be axially and radially secured in an axle drive, with the universal joint being arranged at one end of the propeller shaft. The shaft journal can also be radially resiliently suspended in a resilient intermediate bearing, with the universal joint then being used as a central joint of a two-part or multi-part propeller shaft. In any case, a particular problem exists in axially fixing the universal joint relative to the shaft journal.

BACKGROUND OF THE INVENTION

In existing solutions, the connection between a rear propeller shaft universal joint and an axle drive journal is effected via a flange connection. In such an embodiment, it cannot be avoided that tolerances are added up as a result of out-of-round conditions of the flange relative to the axle drive journal, out-of-round joint conditions and the fit between the universal joint and the flange.

The installation space of modern motor vehicles is subjected to greater and greater restrictions. This also applies to the installation space available for the driveline. At the same time, the requirements to be met by the driveline mounted in the motor vehicle become more and more stringent with respect to out-of-balance tolerances. Out-of-balance as calculated is the product of mass and distance between the center of gravity and the respective rotational axis.

SUMMARY OF THE INVENTION

The present invention provides a connecting assembly wherein a connection combined with secure axial fixing can be simply achieved. More particularly, the inventive connection provides easy assembly conditions and low assembly forces. One solution provides an axially effective engaging connection between a securing sleeve axially firmly connected to the inner joint part, and an annular groove in the shaft journal. The securing sleeve can be axially slotted in the region of the engaging connection with the annular groove and, in addition, in the region of the engaging connection with the annular groove, the securing sleeve can be secured by a clamping mechanism. To ensure that the securing sleeve form-fittingly and positively engages the annular groove, the securing sleeve, can include an inwardly pressed-in annular bead. Such clamping mechanisms can be a standard overlapping clamping strip or an infinite radially crimped clamping ring, for example.

In accordance with one embodiment of the invention, the universal joint is axially fixed on the shaft journal by a securing sleeve which can be provided in the form of a simple plate metal sleeve and which is firmly connected to the inner joint part. For connecting the securing sleeve to the inner joint part, the following connecting mechanisms are mentioned by way of example: the securing sleeve is welded to the inner joint part; the securing sleeve is butt-welded to the inner joint part; the securing sleeve comprises a flange portion which is welded to the inner joint part; the securing sleeve is connected to the inner joint part in an axially form-fitting and positive way; an outer bead engaging an inner groove in the inner joint part is attached to the securing sleeve; or the securing element is provided with holding tabs which pass through the inside of the inner joint part and which, opposite the circumferential groove, are axially supported on the inner joint part.

By producing slots in the securing sleeve, individual tabs result which, when slipping the securing sleeve on to the shaft journal, can be slightly radially resiliently bent outwardly until the form-fitting sleeve engages the annular groove. After assembly, the tabs are radially secured.

According to an alternative embodiment, it is also possible for a securing sleeve which is not circumferentially divided, to be slid on to the shaft journal, and for a portion of the sleeve to be rolled bead-like into the circumferential groove. A connection produced in this way does not need to be secured additionally, although it cannot be readily dismantled in a non-destructive way.

According to a further embodiment, on the side of the inner joint part which is positioned opposite the securing sleeve, an annular cover is annularly welded on, so that the rotationally fast connection between the shaft journal and the inner joint part is fully sealed relative to the joint interior.

According to a still further embodiment, a sealing element, which is sealingly connected to the outer joint part of the universal joint, is secured to the shaft journal. Furthermore, the sealing element together with the securing sleeve can be radially secured on the shaft journal by a clamping mechanism. According to a further embodiment, at its outer circumference, the sealing element is secured in an attaching sleeve which is firmly connected to the outer joint part. In this context, the sealing element, by way of a sealing lip, sealingly rests against a radial face of the shaft journal. This can be accomplished by, for example, a shaft nut.

According to a first alternative, it is possible for the sealing element to include a substantially radially extending membrane seal, specifically with at least one collar portion.

According to a second alternative, it is possible for the sealing element to be a rolling boot which, by way of a collar portion, is arranged on the securing element.

The above-described type of sealing ensures that the connecting assembly is largely corrosion-proof.

The unit consisting of the universal joint, sealing element and securing sleeve can be produced in the form of a pre-assembled sealed unit, eliminating the need for protective elements for sealing the joint interior for transport purposes, such as are frequently required nowadays.

The mounting of such a preassembled unit in the vehicle comprises the following stages: sliding on the sealed universal joint unit until the engaging connection on the shaft journal snaps in; attaching the clamping mechanism which, optionally, had already previously been slid on to the collar portion of the sealing element. Such a unit is completely pre-assembled.

The inventive connecting assembly has the following advantages: the universal joint, sealing element and axial assembly form one unit; the assembly can be removed in a non-destructive way and repeatedly closed or, at most, it can be removed with the securing element being destroyed and replaced, and then closed again; the constant velocity universal joint with the sealing element and axial holding mechanism can be provided in the form of a sealed unit filled with grease, without having to provide additional sealing means for transport purposes; said unit can easily be mounted on the shaft journal; slight modifications provide corrosion protection in the adjoining surroundings, more particularly at the thread of a tensioning nut for tensioning the shaft journal bearing; and the connecting assembly in accordance with the invention is largely independent of the joint type used.

The direct connection between the inner joint part and the shaft journal via shaft toothing comprises only one single connection with tolerances. Thus, the position of the axis of rotation of the propeller shaft can be fixed much more accurately. Any out-of-balance resulting from the eccentricity of the joint position relative to the axis of rotation of a flange connection is thereby avoided.

The inventive connecting assembly ensures secure axial fixing of the universal joint with much reduced tolerances, accompanied by the use of only a few parts. Furthermore, it is possible to reduce the weight of the unit considerably, which, in addition, leads to a reduction in out-of-balance. When using a membrane seal, the unit length can be clearly shortened. The projecting length of the shaft journal can be reduced, which improves the sensitivity of the propeller shaft to vibrations.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 7 shows the resilient sleeve of an inventive connecting assembly according to FIG. 1:
A) in a first axial view;
B) in a longitudinal section; and
C) in a second axial view.

FIG. 8 shows the resilient sleeve of an inventive connecting assembly according to FIG. 2:
A) in a first axial view;
B) in a longitudinal section; and
C) in a second axial view.

FIG. 9 shows the resilient sleeve of an inventive connecting assembly according to FIG. 3
A) in a first axial view;
B) in a longitudinal section; and
C) in a second axial view.

FIG. 10 shows the resilient sleeve of an inventive connecting assembly according to FIG. 4
A) in a first axial view;
B) in a longitudinal section; and
C) in a second axial view.

DETAILED DESCRIPTION OF THE DRAWINGS

FIGS. 1 to 6 will initially be described jointly below to the extent that their details correspond to one another. FIGS. 1 through 6 show a connecting assembly arranged between a shaft journal 11 and a constant velocity universal joint 12. The shaft journal is supported by an angular roller bearing 13 in a housing 14 which, in this case, is illustrated in the form of an axle housing in the driveline of a motor vehicle. The constant velocity universal joint 12 is connected to a propeller shaft 17 of the motor vehicle driveline. Instead of the axle drive, it is possible to use an intermediate bearing of the driveline for accommodating the shaft journal 11. The annular roller bearing 13 is axially tensioned by a tensioning nut 18 which has been threaded on to a threaded portion 15 of the shaft journal. The tensioning nut 18 is sealed relative to the axle housing 14 by a shaft seal 20. By way of a cover 21 secured to the tensioning nut 18, the shaft seal is protected against mechanical damage. The constant velocity universal joint 12 comprises an outer joint part 22 welded to the propeller shaft 17 by a welded-on collar 23, an inner joint part 24, torque transmitting balls 26 as well as a ball cage 25. The constant velocity universal joint 12 is a fixed joint wherein there are provided first pairs of ball tracks 27, 28 which open towards the axle housing 14, and second pairs of ball tracks 29, 30 which open towards the propeller shaft 17. The inner joint part 24 is secured on a toothed shaft portion 16 of the shaft journal 11 in a rotationally fast way. Between the collar 23 and the outer joint part 22, there is inserted a cover 31 which seals the joint towards the propeller shaft 17 and, more particularly, contains the grease filling for the joint. Furthermore, a plate metal outer joint part sleeve 32 which encloses the outer circumference of a membrane seal 33 and which, in a way to be described later, seals the constant velocity universal joint relative to the shaft journal 11, is positioned on the outer joint part 22. The outer joint part cover 32 may be welded and/or rolled onto the outer surface of the outer joint part 22. Between the threaded portion 15 of the shaft journal 11 and the toothed shaft portion 16 of the shaft journal 11, in a fixing portion 19, there is formed an annular groove 39 at the shaft journal, which annular groove 39 is engaged by a securing sleeve 41 by way of an inwardly pressed-in annular bead 43, which is axially connected to the inner joint part 24 of the constant velocity universal joint by crimping or other known methods to axially secure the constant velocity universal joint 12 relative to the shaft journal 11. The securing sleeve 41 is overlapped by a collar portion 34 of the membrane seal 33, which collar portion 34, together with the sleeve 41, is axially form-fittingly and positively secured in the annular groove 39 by way of a clamping strip 42. A sealing lip 35 resting directly against the tensioning nut 18 is formed on to the collar portion 34.

Figure 1:
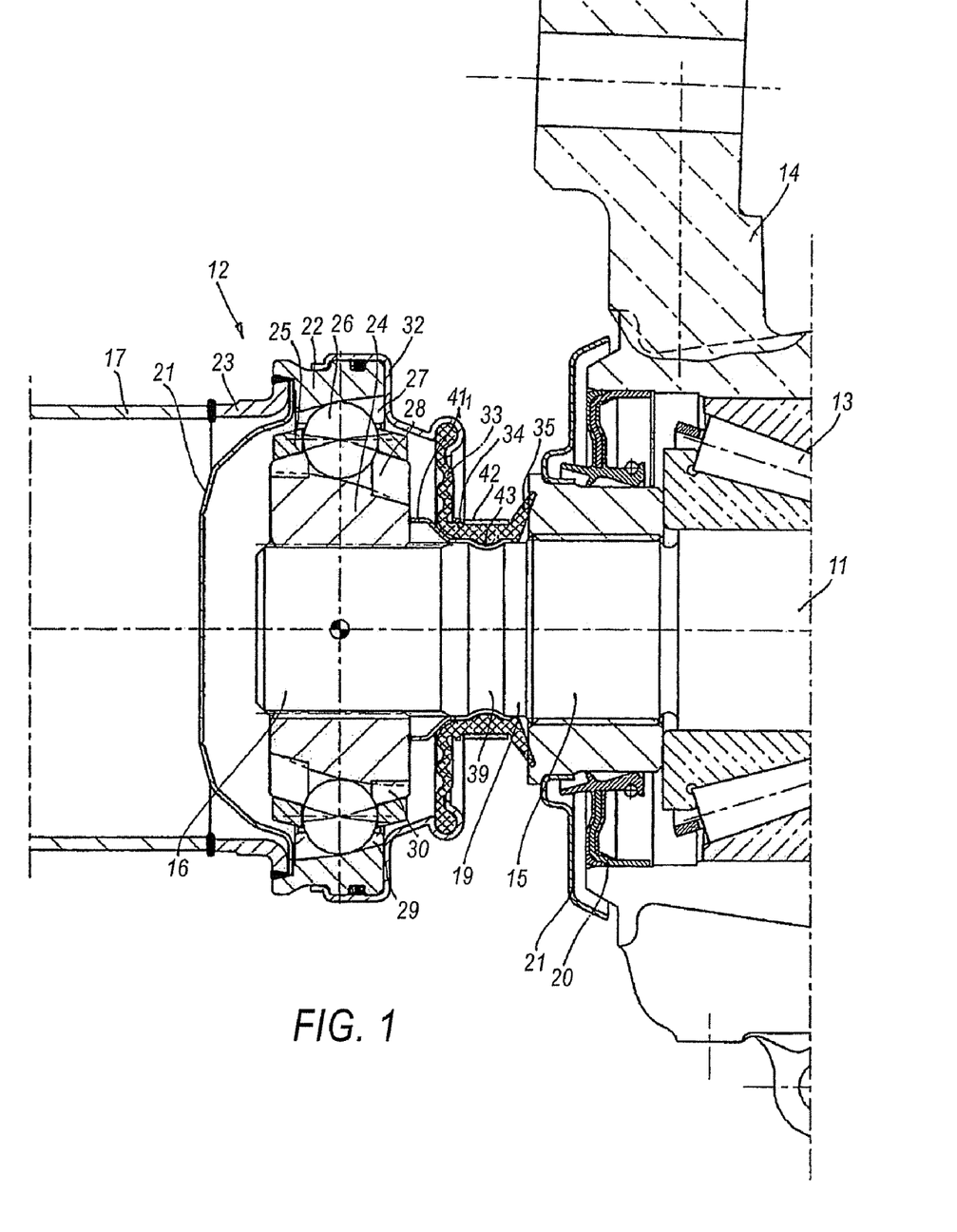
FIG. 1 shows a first embodiment of an inventive connecting assembly between a shaft journal and a constant velocity universal joint.

In FIG. 1, the securing sleeve $41_1$ is provided with a cylindrical end portion 55 which is butt-welded to the inner joint part 24 of the constant velocity universal joint.

Figure 2:
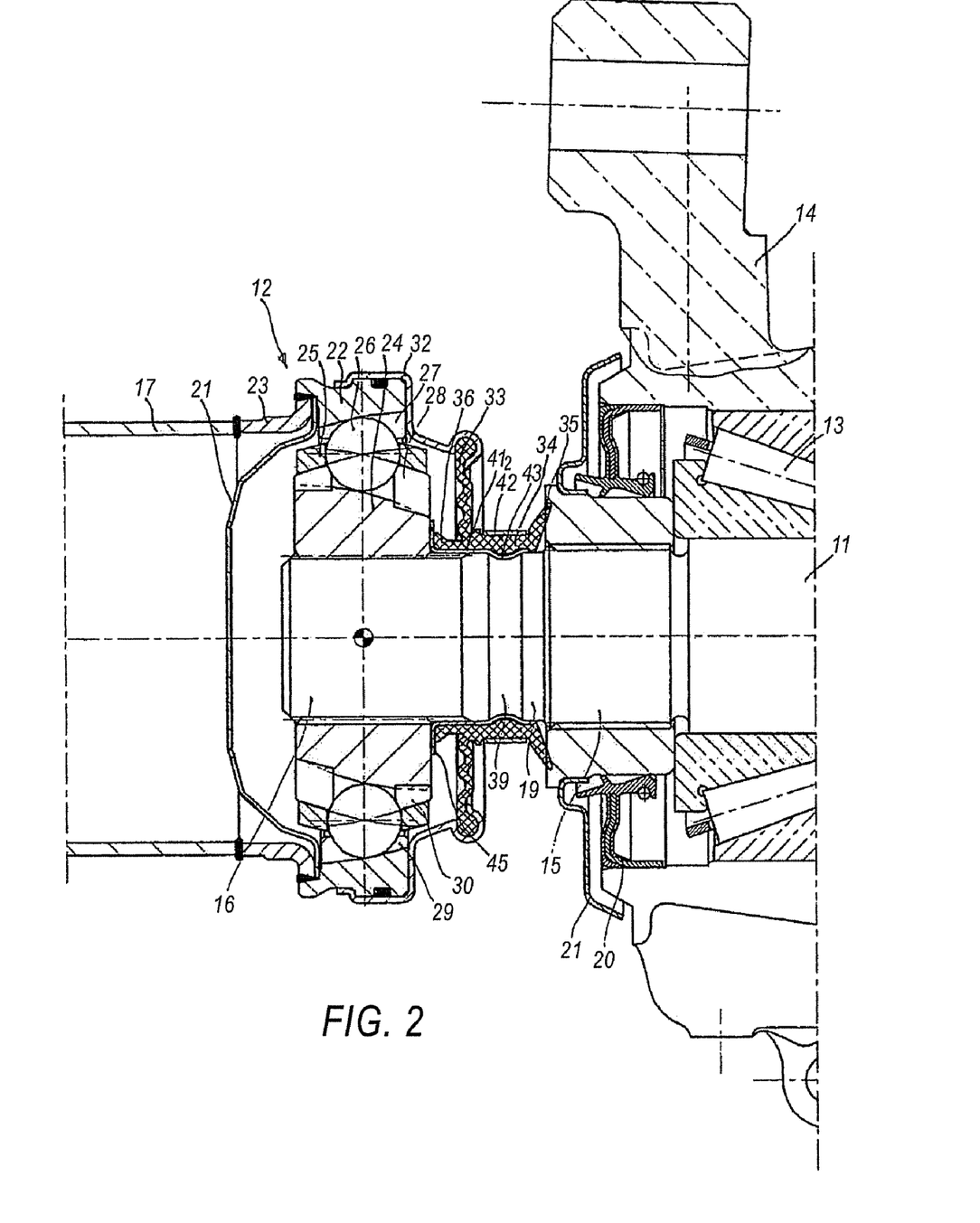
FIG. 2 shows a second embodiment of an inventive connecting assembly between a shaft journal and a constant velocity universal joint.

In FIG. 2, the securing sleeve $41_2$ is provided with an end flange 45 which rests against the inner joint part 24 in a planar way and is welded thereto. The membrane seal 33 comprises a second collar portion 36 and sealingly rests against the end flange 45.

Figure 3:
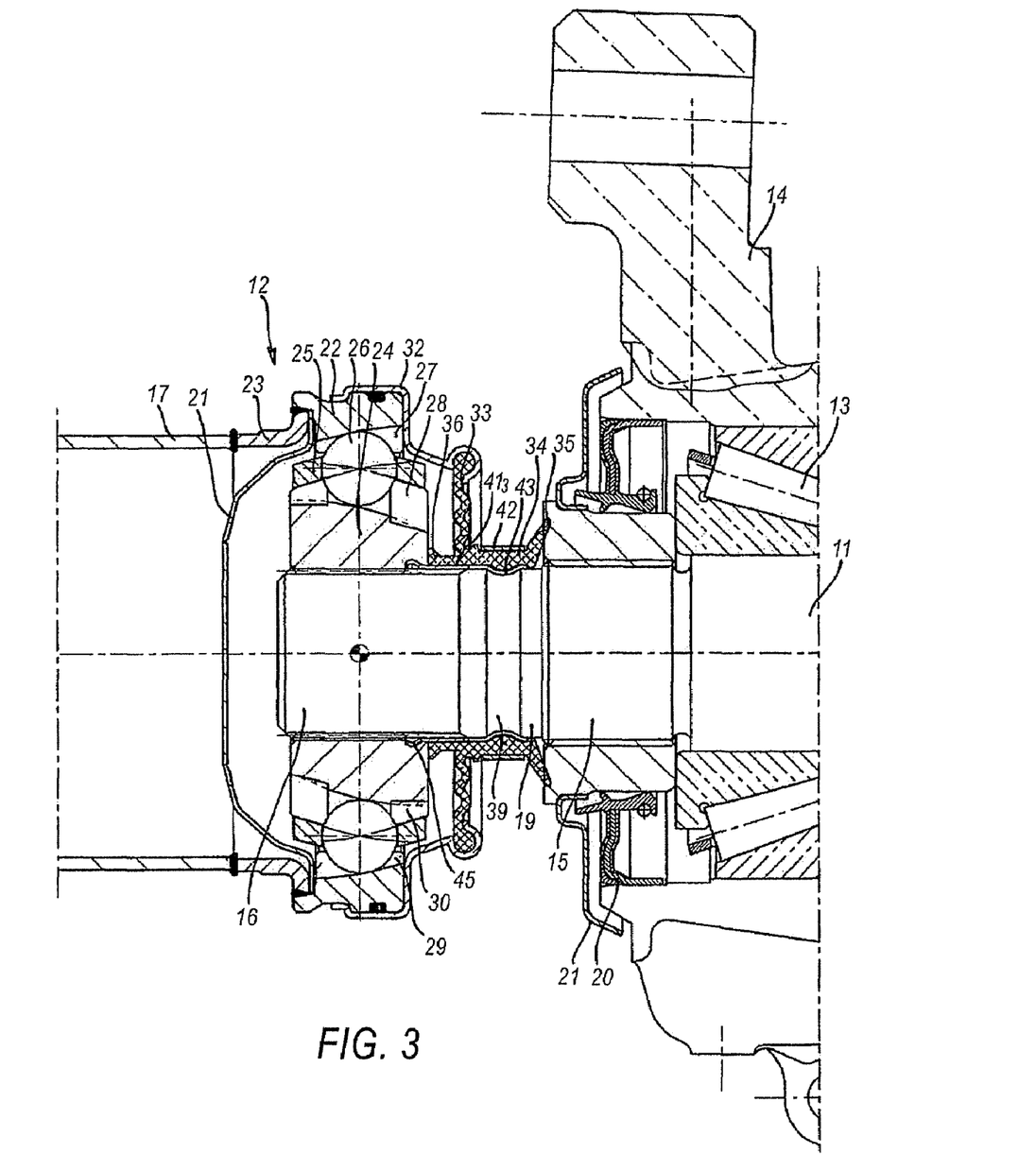
FIG. 3 shows a third embodiment of an inventive connecting assembly between a shaft journal and a constant velocity universal joint.

In FIG. 3, the securing sleeve $41_3$ is provided with a holding bead 47 which engages an inner circumferential groove 40 of the inner joint part 24. In this embodiment, too, the membrane seal 33 comprises a second collar portion 36 which rests directly against the inner joint part 24.

Figure 4:
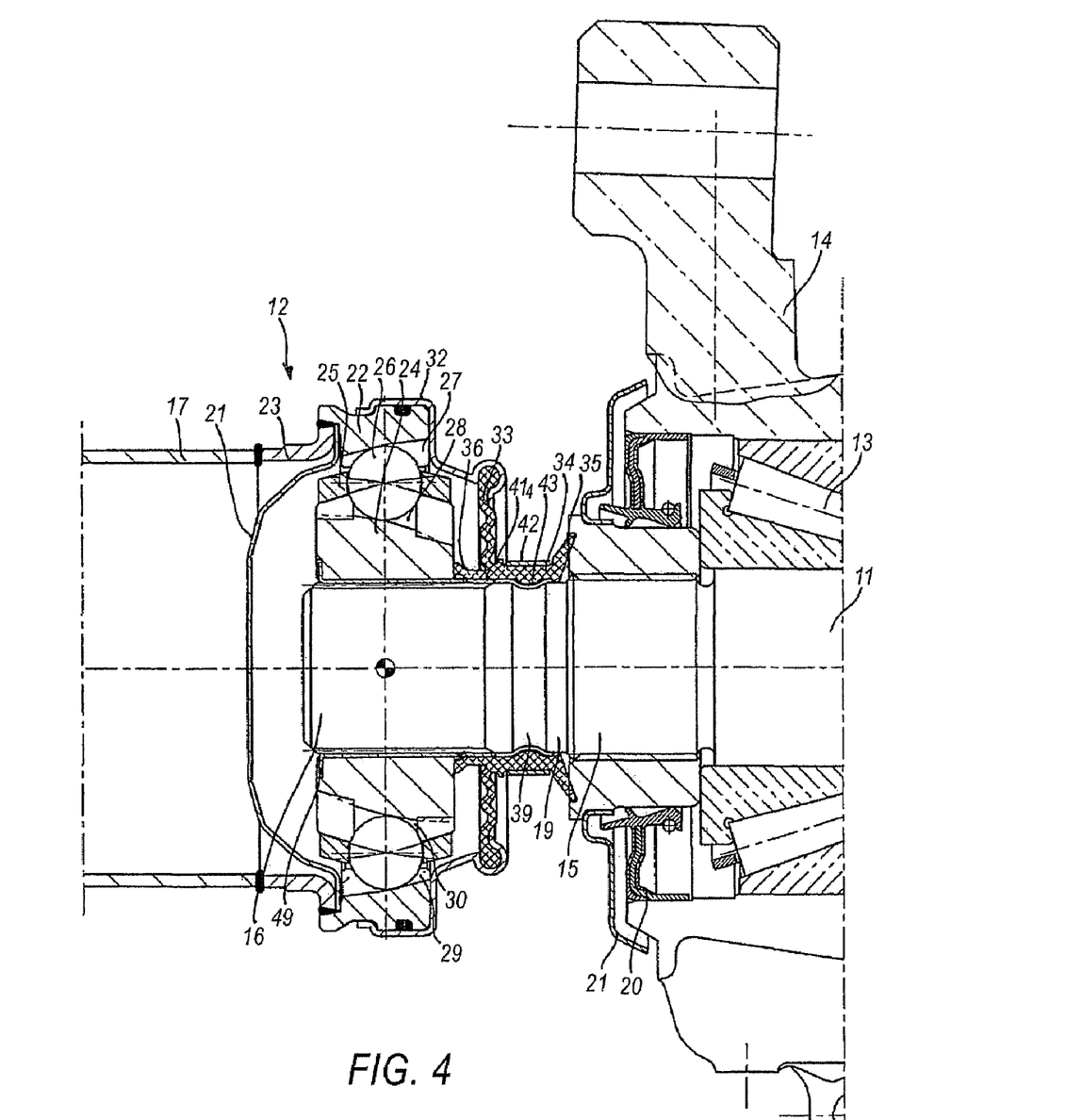
FIG. 4 shows a fourth embodiment of an inventive connecting assembly between a shaft journal and a constant velocity universal joint.

In FIG. 4, the securing sleeve $41_4$ is provided with holding tabs 48 (FIG. 10B) the ends of which are provided with flange portions 49 which axially rest against the side of the inner joint part 24 which is positioned opposite the circumferential groove 39.

Figure 5:
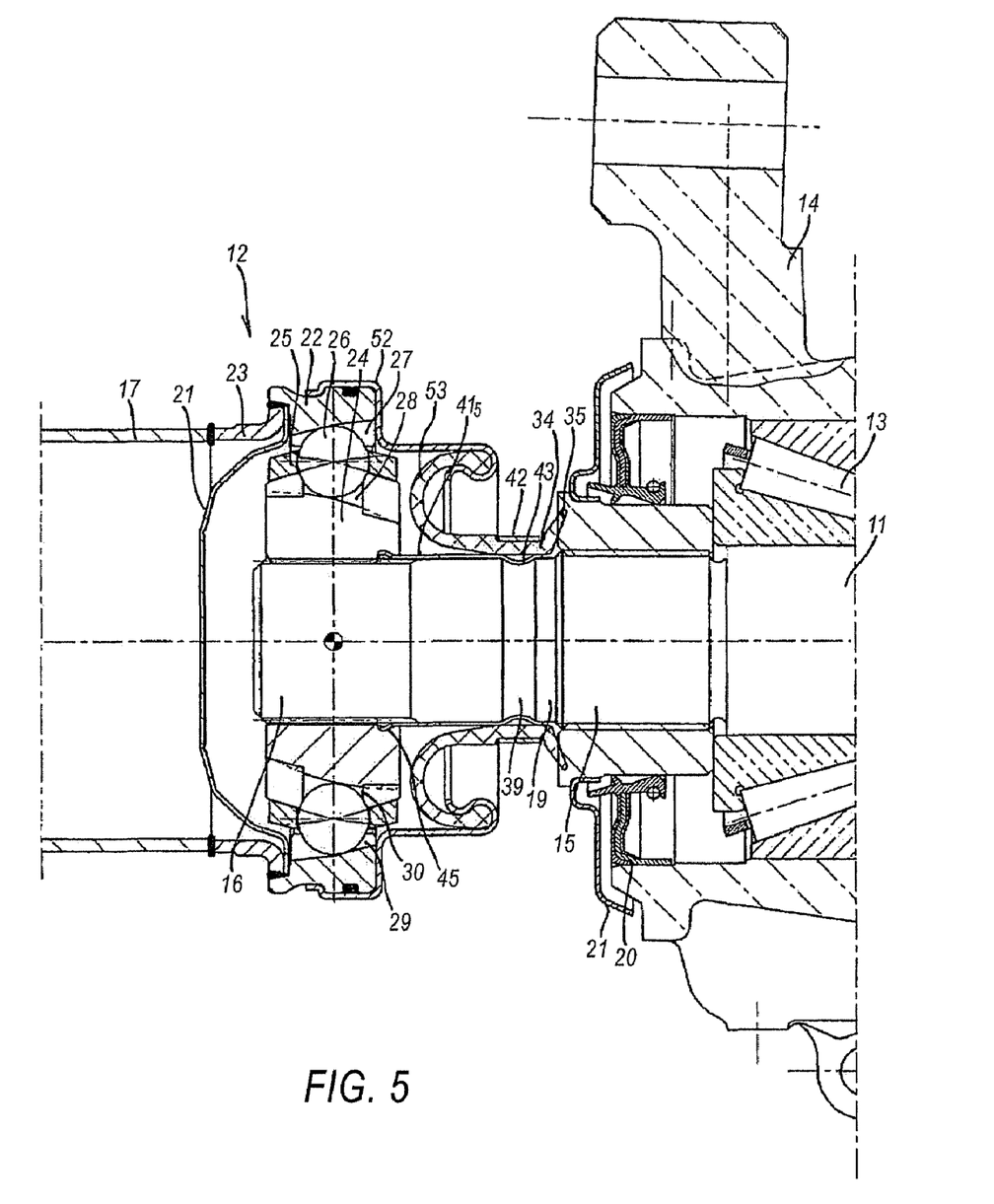
FIG. 5 shows a fifth embodiment of an inventive connecting assembly between a shaft journal and a constant velocity universal joint.

In FIG. 5, the securing sleeve $41_5$ is of the type as shown in FIG. 3, but it comprises a greater axial length. This is due to the fact that instead of the shorter membrane seal according to the previous embodiment in this embodiment, a rolling boot 53 is held in a sleeve 52 which is secured on the outer joint part 22. The rolling boot 53 is again secured by a tensioning strip 42 in the region of the circumferential groove 39, but it is not shown as form-fittingly and positively engaging the grooves although it could include a bead for doing so.

Figure 6:
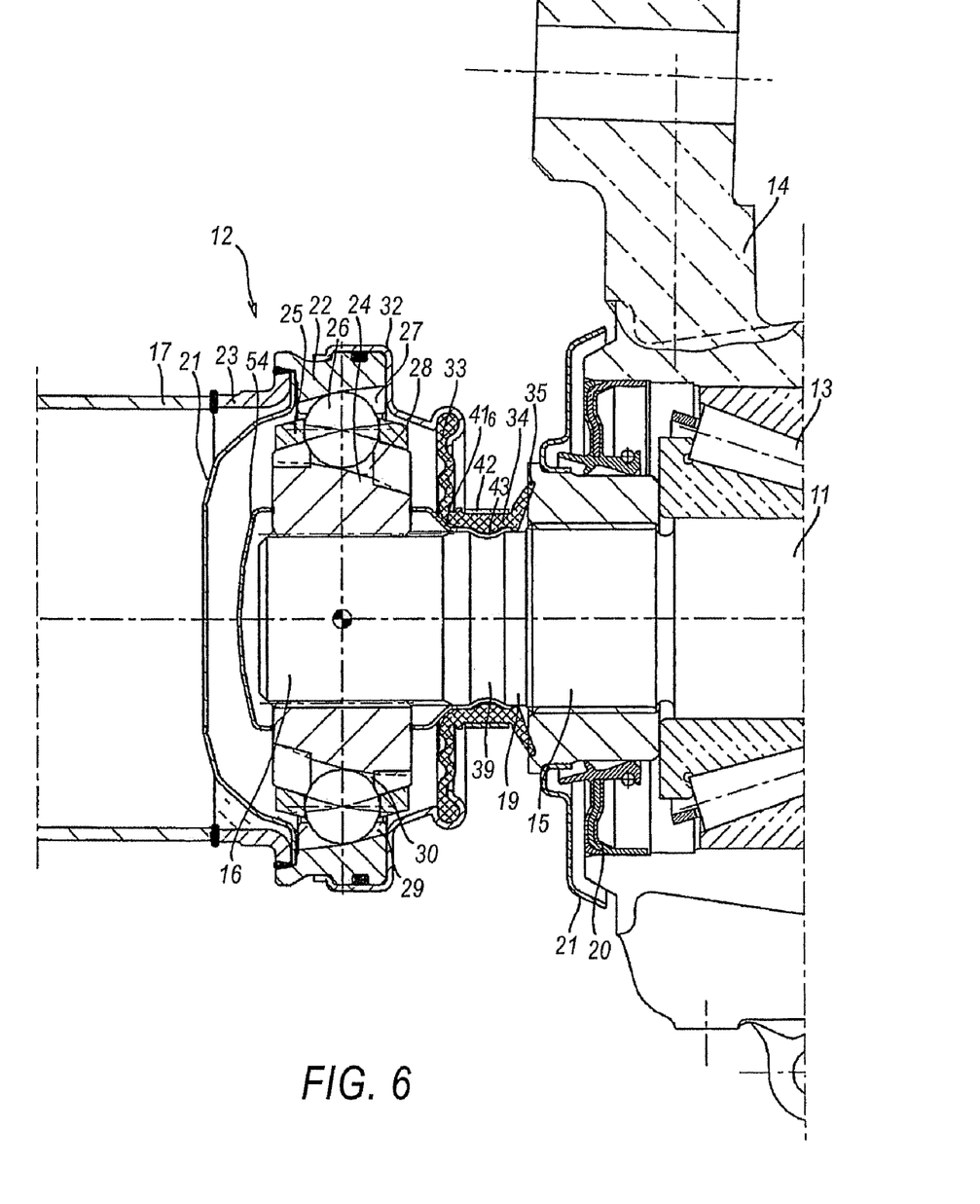
FIG. 6 shows a sixth embodiment of an inventive connecting assembly between a shaft journal and a constant velocity universal joint.

In FIG. 6, the securing sleeve $41_6$ substantially corresponds to the securing sleeve according to FIG. 1. On the side of the inner joint part 24 which is positioned opposite the securing sleeve there is welded on an annular cover 54 which seals the axial toothing of the end portion jointly with the securing sleeve $41_6$ relative to the joint interior.

Figure 7A:
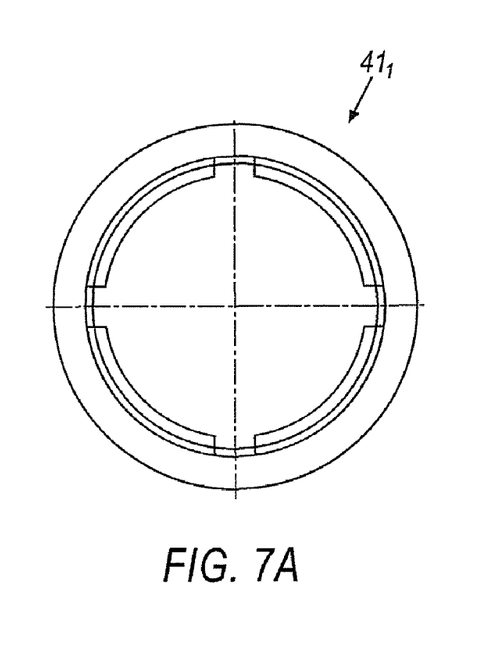
Figure 7B:
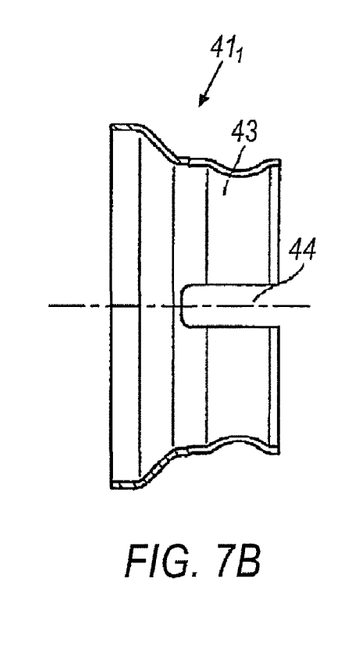
Figure 7C:
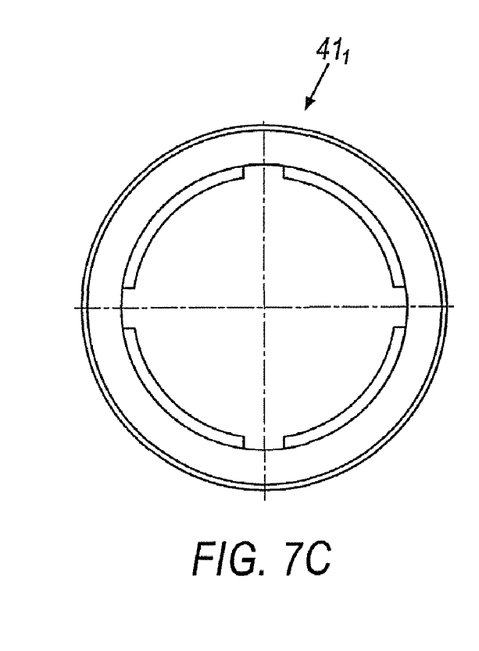

In FIG. 7, the securing sleeve $41_1$ of FIG. 1, which is substantially identical to the securing sleeve $41_6$ according to FIG. 6, is shown in the form of a detail. It can be seen that, in its right-hand axial half, the sleeve comprises a circumferentially pressed-in annular bead 43 engaging the circumferential groove 39 and, in the region of said annular bead 43, said sleeve comprises longitudinal slots 44 which facilitate radial outward bending of the sleeve portion to allow same to be slipped on to the shaft journal until it engages the circumferential groove 39.

Figure 8A:
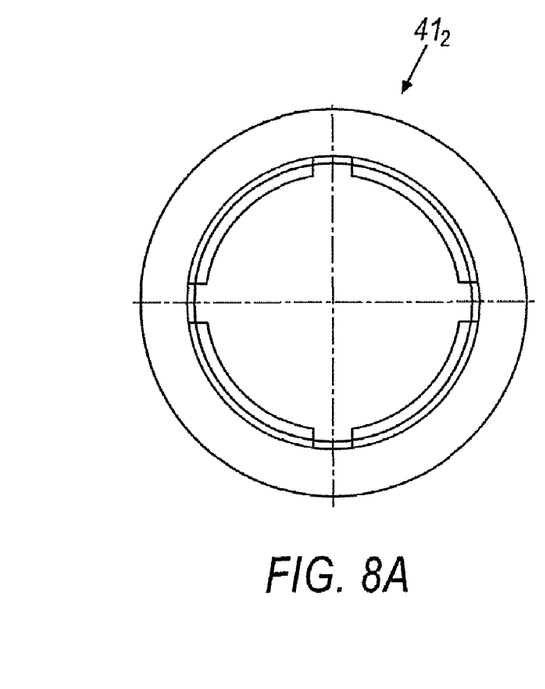
Figure 8B:
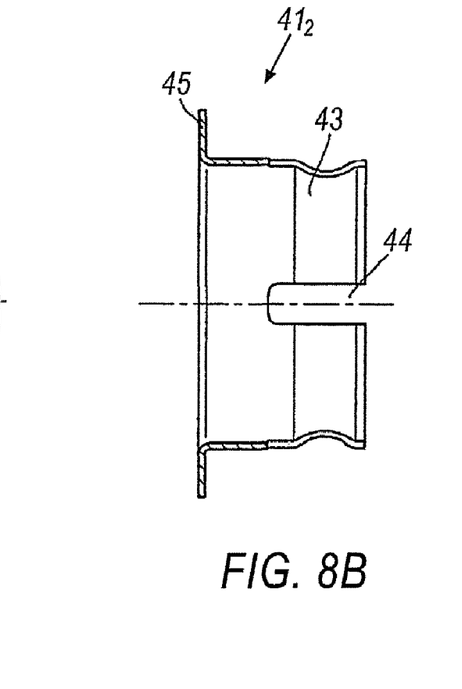
Figure 8C:
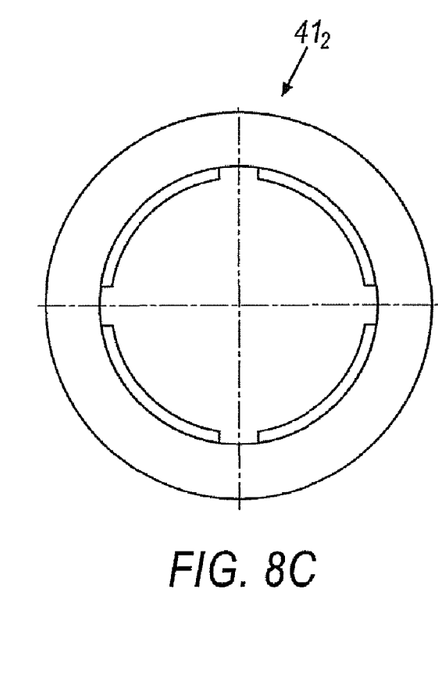

In FIG. 8, which corresponds to the securing sleeve $41_2$ of FIG. 2, the securing sleeve $41_2$ is provided with the end flange 45 and the annular bead 43. The longitudinal slots 44 are also shown.

Figure 9A:
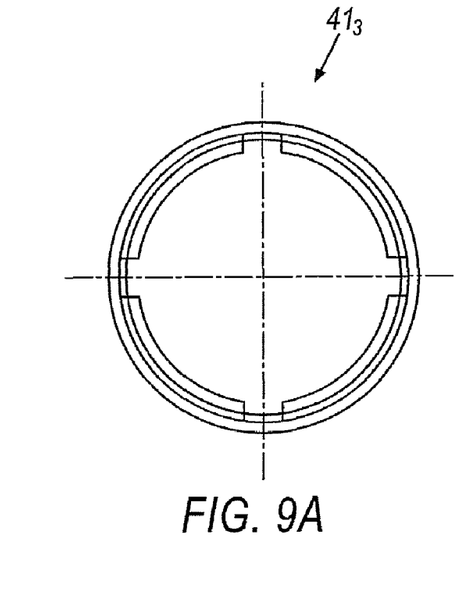
Figure 9B:
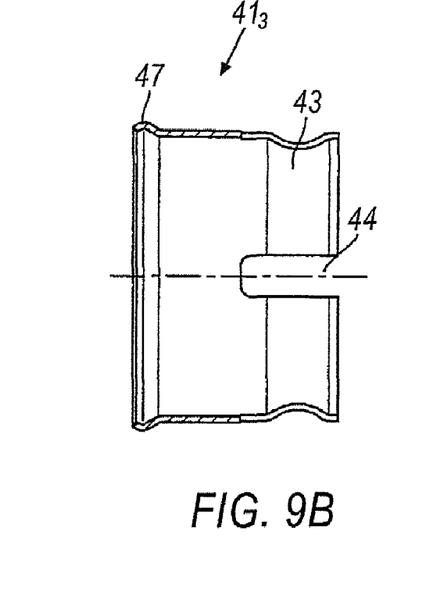
Figure 9C:
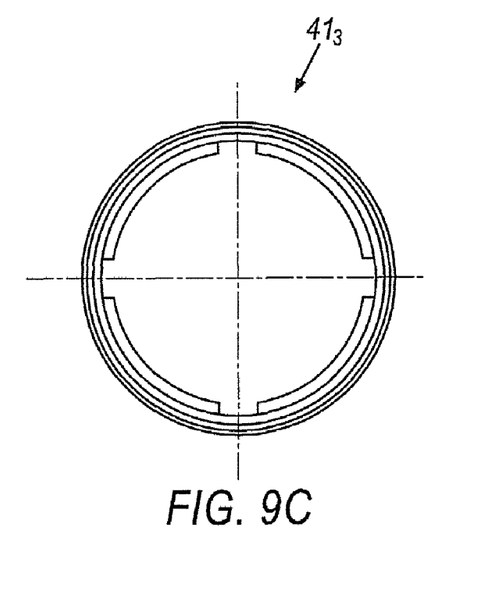

In FIG. 9, there is shown the securing sleeve $41_3$ of FIG. 3 which comprises an outer annular bead 47 for engaging an annular inner groove in the inner joint part and the inner annular bead 43 and the longitudinal slots 44. In the region of the annular bead 47, too, there could be provided longitudinal slots which start from the other end and serve to increase elasticity. In this embodiment, the securing sleeve $41_3$ is rolled, fixing the annular head 47 into the inner joint part inner annular groove 40. The securing sleeve $41_3$ is then slid onto the shaft journal until the annular bead 43 engages the annular groove 39.

Figure 10A:
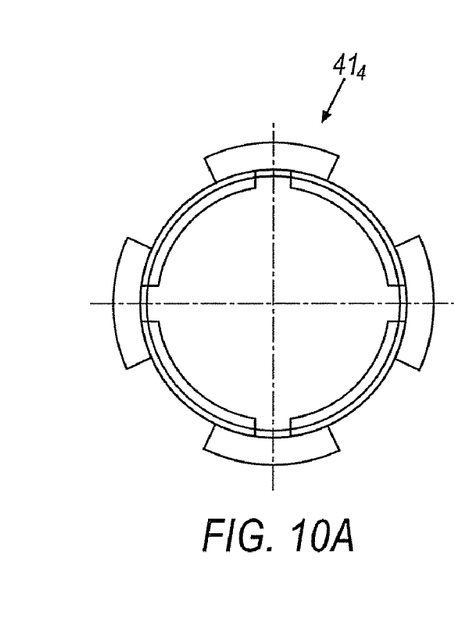
Figure 10B:
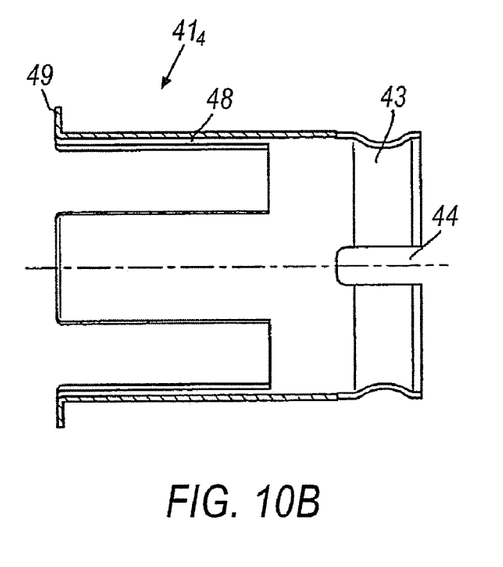
Figure 10C:
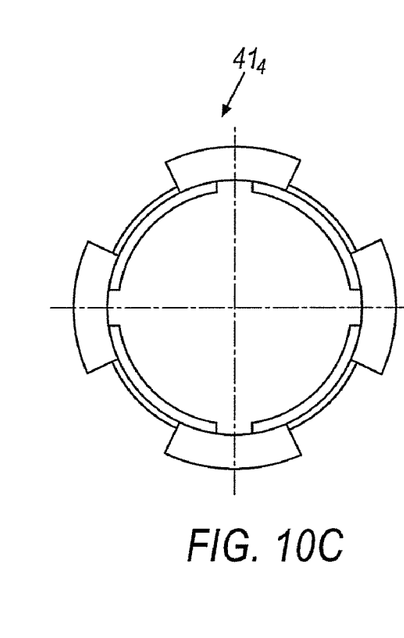

In FIG. 10, there is shown the securing sleeve $41_4$ of FIG. 4 which includes the holding bead 43 and the longitudinal slots 44 as in the previously described sleeves. At the left-hand end, however, there are provided individual holding tabs 48 which are connected to flange faces 49. The holding tabs 48 pass through the inner joint part in regions which are free from any toothing, whereas between the holding tabs 48 there are positioned toothed regions of the inner joint part which are connected in a rotationally fast way to counter toothings on the end of the shaft journal.

The inventive assembly is advantageous in that a pre-assembled unit can be provided for further driveline assembly. The pre-assembled unit comprises the universal joint 12, sealing element 46 comprising the outer joint part sleeve 32 and sealing membrane 33 or rolling boot 53, and securing sleeve 41. The cover 31 may also be included to provide a completely sealed, pre-assembled unit which can be readily transported without the need for temporary protective seals on covers.

In operation, the pre-assembled unit is slid onto the shaft journal 11 until the annular bead 43 of the securing sleeve 41 engages the annular groove 39 on the shaft 11. A clamping mechanism such as clamping strip 42 carried on a collar portion 56 of the sealing element 46 then secures the pre-assembled, sealed unit to the shaft 11.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A connecting assembly between a shaft journal and a universal joint including an inner joint part engaged by the shaft journal, the assembly comprising a securing sleeve firmly connected to the inner joint part and radially resiliently engaging an annular groove formed in the shaft journal, the assembly further comprising a clamping mechanism radially fixing the securing sleeve in a region of the engaging connection with the annular groove, wherein the connection between said securing sleeve and said annular groove is axially effective and wherein said securing sleeve is a metal plate, the assembly further comprising a sealing element sealingly connected to an outer joint part of the universal joint and secured on the shaft journal and wherein said clamping mechanism radially fixing the sealing element and securing sleeve in said region of the engaging connection with the annular groove.

2. An assembly according to claim 1 wherein the securing sleeve is axially slotted in a region of the engaging connection with the annular groove.

3. An assembly according to claim 1 wherein the securing sleeve comprises an inner annular bead for engaging the annular groove.

4. An assembly according to claim 1 wherein the securing sleeve is connected to the inner joint part by a weld along an edge or a flange portion to the inner joint part.

5. An assembly according to claim 1 wherein the securing sleeve is connected to the inner joint part by an outer bead engaging an inner groove in the inner joint part.

6. An assembly according to claim 1 wherein the securing sleeve is connected to the inner joint part by holding tabs having flange faces adapted to pass through an interior of the inner joint part and which, opposite the annular groove, are axially supported on the inner joint part.

7. An assembly according to claim 1 wherein the sealing element comprises a seal secured to an attaching sleeve which attaching sleeve is connected to the outer joint part.

8. An assembly according to claim 7 wherein the seal comprises a substantially radially extending membrane seal comprising at least one collar portion.

9. An assembly according to claim 7 wherein the seal comprises a rolling boot.

10. An assembly according to claim 1 wherein the sealing element comprises a sealing lip for engaging a radial face in communication with the shaft journal.

11. A sealed constant velocity universal joint assembly comprising:
    an outer joint part with outer ball tracks;
    an inner joint part with inner ball tracks and a toothed bore for receiving a toothed portion of a shaft journal, the outer and inner ball tracks forming pairs of ball tracks;
    a ball cage holding a plurality of torque transmitting balls, each ball being located in one of the pairs of ball tracks;
    a securing sleeve connected to the inner joint part and axially extending toward the shaft journal, the securing sleeve including an engaging mechanism for radially resiliently engaging an annular groove in the shaft journal;
    a sealing element sealingly connected to the outer joint part and carried on the axial extension of the securing sleeve for securing to the shaft journal in the region of the annular groove;
    a clamping mechanism surrounding the sealing element and the securing sleeve for fixing both to the shaft journal in the region of the annualar groove, said clamping mechanism axially fixing said securing sleeve to said shaft journal.

12. The assembly of claim 11 comprising a cover sealing the outer joint part at an end opposite the sealing element.

13. The assembly of claim 11 wherein the sealing element comprises a seal secured to an attaching sleeve which attaching sleeve is connected to the outer joint part, the seal comprising a rolling boot or a membrane seal having at least one collar portion.

14. The assembly of claim 11 wherein the securing sleeve comprises an inner annular bead for engaging the annular groove and wherein the securing sleeve is axially slotted in a region of the engaging connection with the annular groove.

15. The assembly of claim 11 wherein the securing sleeve is connected to the inner joint part by holding tabs having flange faces adapted to pass through the toothed bore of the inner joint part and which, opposite the annular groove, are axially supported on the inner joint part.

* * * * *